I. A. Heald.
Cigar Mach.
No. 1,751. Reissued Aug. 30, 1864.
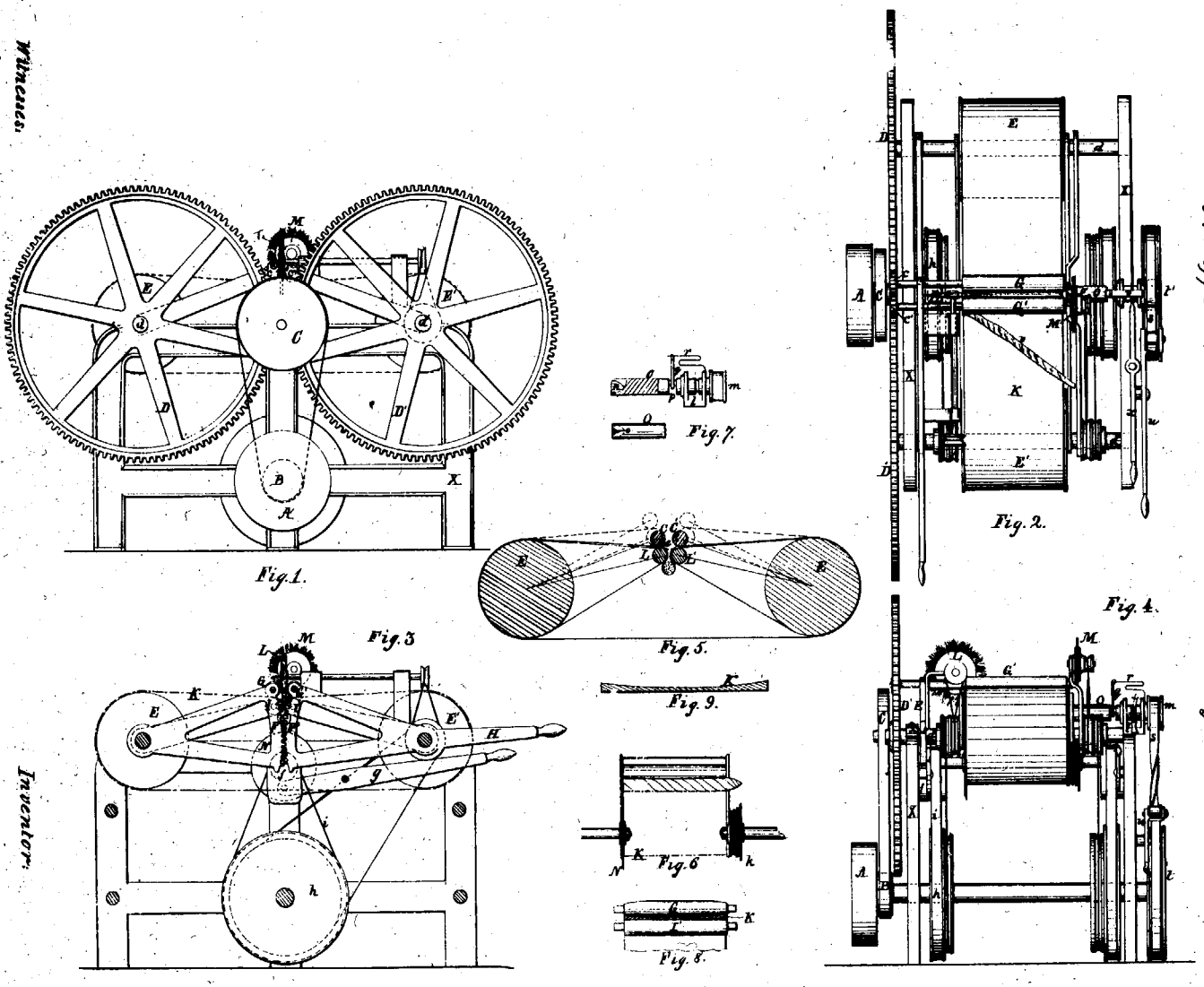
Witnesses:
R. B. Heacock
Milton Bradley.
Inventor:
I. A. Heald.

UNITED STATES PATENT OFFICE.

I. A. HEALD, OF WASHINGTON, DISTRICT OF COLUMBIA.

CIGAR-MACHINE.

Specification forming part of Letters Patent No. 32,993, dated August 6, 1861; Reissue No. 1,751, dated August 30, 1864.

*To all whom it may concern:*

Be it known that I, I. A. HEALD, of Washington city, in the District of Columbia, (formerly of Springfield, Massachusetts,) have invented a new and Improved Cigar-Machine; and I do hereby declare that the following is a full, clear, and exact description of the same, reference being had to the accompanying drawings, making a part of this specification, in which—

Figure 1 is a side elevation of the machine; Fig. 2, a plan or top view; Fig. 3, a longitudinal vertical section inside the frame, and Fig. 4 an end elevation. Figs. 5, 6, 7, 8, and 9 are views of detached portions of the machine.

X is the frame supporting the rest of the machine.

A is the main driving-pulley, through which motion is communicated to the machine. On the same shaft is the pulley B, which is belted to pulley C. Behind the pulley C, and on the same shaft, is a pinion gearing into the spur-gear wheels D D′ on the shafts *d d′*. Also, running loosely on the same shafts are the rolls or cylinders E E′.

F F′ are two segmental gears, working together and attached loosely to the shafts *d d′*.

G G′ are two top rolls supported at one end by the segments F F′, and at the other by suitable radial supports from the shafts *d d′*. On the end of each of these rolls is a pinion, *c c′*, gearing into the wheels D D′.

H is a lever or handle attached to the segment F, by means of which the segments are rotated about their centers, and thereby the rolls G G′ elevated or depressed.

I I′ are two bottom rolls, also supported from the centers *d d′*, and movable with the rolls G G′.

K is an endless belt or apron, running over the cylinders E E′ and between the rolls G I and G′ I′, and forming between the two sets of rolls a loop or pocket, *e*, for the reception of the unrolled tobacco, which is intended to form the filling of the cigar. This is more fully shown in Fig. 5, in which the dotted lines show the position of the rolls when elevated by means of the handle H and segments F F′. The pinions on the rolls G G′ cause them to feed the belt through gradually, thus giving a rolling motion to anything confined in the loop *e* of the belt. The belt also serves as an apron, on which to feed in the wrappers or covers to the cigars.

L is a brush for brushing the end of the wrapper down into the loop, thereby starting it to roll or wrap around the filling.

M is another brush for applying paste to the last end of the wrapper as it comes round, thus enabling it to be stuck down and make a smooth end.

N is a rotary cutter, for cutting off the end of the cigar after the wrapper has been put on. This cutter N is secured to the end of a shaft supported in a box, *f*, which is movable and can be raised or lowered by the handle or lever *g*. Motion is communicated to the cutter N from the pulley *h* on the main shaft by the belt *i*.

*k* is a cutter or shaper, composed of a series of circular saws, for shaping or giving form to the point or small end of the cigar before the wrapper is applied. The size of the saws is so graduated as to give to the end of the cigar the desired form, as clearly shown in Fig. 6.

O is a rotary header, consisting of a rod of iron or other metal, supported in a bearing, *l*, with a pulley, *m*, on end, and having in its opposite end a conical hole or recess, *n*, correponding to the form of the small end of the cigar when finished. In the rod O, between the two supports of the bearing *l*, is a groove, into which a forked lever, *x*, is inserted for the purpose of moving the header up to or back from the cigar by sliding it in the bearing *l*. Fig. 7 shows two views of the header, the upper one being a side view in partial section, the other a plan view of the end of the rod with the conical cavity, and showing a slot connecting with said cavity to admit the wrapper.

*p* is a small crank made in the rod O and attached by the connection *q* to the spring *r*, by means of which the slot *o* is always returned to the top when the header is not in use. The header is put in motion by means of the belt *s* from pulley *t* on the main shaft. The belt is slack, except when tightened by the binder *w*. Therefore the crank and spring are sufficient to keep the header in place and cause the belt to slip, except when the binder is applied.

Having thus fully described the construction of the several parts, I will proceed to describe their operation.

Supposing the rolls G G′ and I I′ to be elevated, as shown by the dotted lines in Fig. 5, the rolls, by the operation of elevating, are sufficiently thrown apart to give access to the loop *e* of the belt, which loop is kept of a sufficient size to receive a suitable quantity of filling by making the pinions *c c′* on the rolls G G′ smaller than the rollers, thereby feeding in an extra quantity of the belt, when they are rotated around the large gears by the process of elevating. Having placed in the loop the proper quantity of filling, throw down the rolls, thereby forming a loop entirely enveloping the filling, with the exeeption of the space between the rolls I I′, for admitting the wrapper. As soon as the rolls are depressed the filling begins to be rolled by the continuous motion of the belt. Now bring up the cutter *k* and form the end of the filling suitable for putting on a wrapper, after which lay a wrapper on the apron in the position shown in Fig. 2, at *v*, when the end will be seized by the roller G′, by means of which and the brush L it will be round the filling. Then bring the header O up to the edge of the belt ready to receive the projecting end of the wrapper, which, as it comes under the brush M, receives the paste and is received by the slot *o* into the conical cavity. Now applying the binder *w* to the belt *s* gives to the header O a rotary motion and finishes the end of the cigar; and, lastly, cut off the end to be lighted by means of the rotary cutter N, when the rolls can be thrown up and the finished cigar removed.

A wrapper of a cigar is made from one half of a leaf only, and in order to use both halves of the leaf the machine must be capable of running in both directions, which is easily accomplished by employing some of the ordinary right-and-left movements in transmitting power to the machine through the main pulley, the only difference in the construction of the machine for that purpose being the introduction of another paste-brush on the other side of the feed-rolls.

Fig. 8 shows a form for belt and rolls for giving the cigar the peculiar form common to those made by hand. The form of the cigar is produced by the form of the belt, (shown larger in cross-section at Fig. 9, in which it is thickest at the edges,) by which means the cigar is made largest in the middle. In using such a belt the bottom roll is used as before, but a top roll is substituted corresponding in form with the belt, as seen at Fig. 8. By thus changing the form of the belt any desirable form of cigar may be made.

Having thus fully described the construction and operation of my machine, what I claim as my invention, and desire to secure by Letters Patent, is—

1. Running a belt in the form of a loop, whereby a single belt is made to inclose and form a bearing for the whole outside surface of the cigar, with the exception of a sufficient space to admit the wrapper.

2. The use of a belt of unequal thickness for the purpose of giving to the cigar any required degree of taper or for giving it any other desirable form, substantially as shown.

3. The rotary brush L, when used for the purpose of facilitating the insertion of the wrapper and to insure the winding of the same around the filling.

4. Forming or shaping the end of a cigar by means of a series of rotary cutters having either smooth or serrated edges, substantially as described.

5. Finishing or cutting off the end of a cigar by means of the rotary cutter N or its equivalent, substantially as described.

6. Applying paste to the wrapper of a cigar at the moment of applying said wrapper to the cigar by means of the brush M, or its equivalent, substantially as shown and described.

I. A. HEALD.

Subscribed and acknowledged before us, July 28, 1864:

JAS. CULL,
CHAS. A. ROGERS.